United States Patent
Feistkorn et al.

[11] Patent Number: 6,089,745
[45] Date of Patent: Jul. 18, 2000

[54] PROCEDURE FOR FEEDING PLASTIC GRANULATE INTO THE INTAKE OPENING OF A PLASTIC EXTRUDER

[75] Inventors: Werner Feistkorn, Saerbeck; Christof Herschbach, Muenster; Hans-Udo Beckmann, Lüdenscheid; Richard Saatkamp, Lengerich, all of Germany

[73] Assignee: Windmoeller & Hoelscher, Lengerich, Germany

[21] Appl. No.: 09/139,648

[22] Filed: Aug. 25, 1998

[30] Foreign Application Priority Data

Aug. 25, 1997 [DE] Germany .......................... 197 36 979

[51] Int. Cl.⁷ ..................................................... B29B 7/88
[52] U.S. Cl. ........................................ 366/76.2; 366/76.92
[58] Field of Search .............................. 366/76.1, 76.2, 366/76.9–76.93, 141, 151.1, 152.6; 264/40.4; 425/145, 147, 148

[56] References Cited

U.S. PATENT DOCUMENTS

| | | | |
|---|---|---|---|
| 3,410,530 | 11/1968 | Gilman | 366/76.2 |
| 3,871,629 | 3/1975 | Hishida | 366/76.2 |
| 3,920,229 | 11/1975 | Piggott | 366/76.2 |
| 4,486,100 | 12/1984 | Endo et al. | 366/76.93 |
| 5,110,521 | 5/1992 | Moller | 425/148 |
| 5,148,943 | 9/1992 | Moller | 366/76.91 |
| 5,213,724 | 5/1993 | Saatkamp | 425/148 |
| 5,282,548 | 2/1994 | Ishihara | 366/76.91 |
| 5,683,632 | 11/1997 | Shimizu et al. | 264/40.4 |
| 5,772,319 | 6/1998 | Pemberton et al. | 366/76.2 |

FOREIGN PATENT DOCUMENTS

| | | | |
|---|---|---|---|
| 507689 | 10/1992 | European Pat. Off. | 366/141 |
| 40 27 319 | 3/1992 | Germany . | |

*Primary Examiner*—Charles E. Cooley
*Attorney, Agent, or Firm*—Jacobson, Price, Holman & Stern, PLLC

[57] ABSTRACT

A procedure for feeding plastic granulate into the intake opening of a plastic extruder with a storage tank, and with an intermediate storage tank resting on a weighing device. In the procedure, the specified quantity by weight of material processed for the particular batch is determined by the rotations of the extruder screw In order to specify a procedure in which the recipe-, or batch-, change times is considerably shortened and plastic granulate is conserved, it is provided that the intermediate storage tank is filled through opening of the storage tank discharge with a specific quantity by weight of plastic granulate, and the storage tank is filled with its constant fill quantity after re-closure of its discharge, when the sum of the weight of the fill of both storage tanks corresponds to the remaining quantity by weight to be processed by the extruder, and that the conveyance of plastic material into the storage tank is discontinued, and the storage tank discharge is opened one or more times, until she quantity stored in it has entered into the intermediate storage tank.

4 Claims, 1 Drawing Sheet

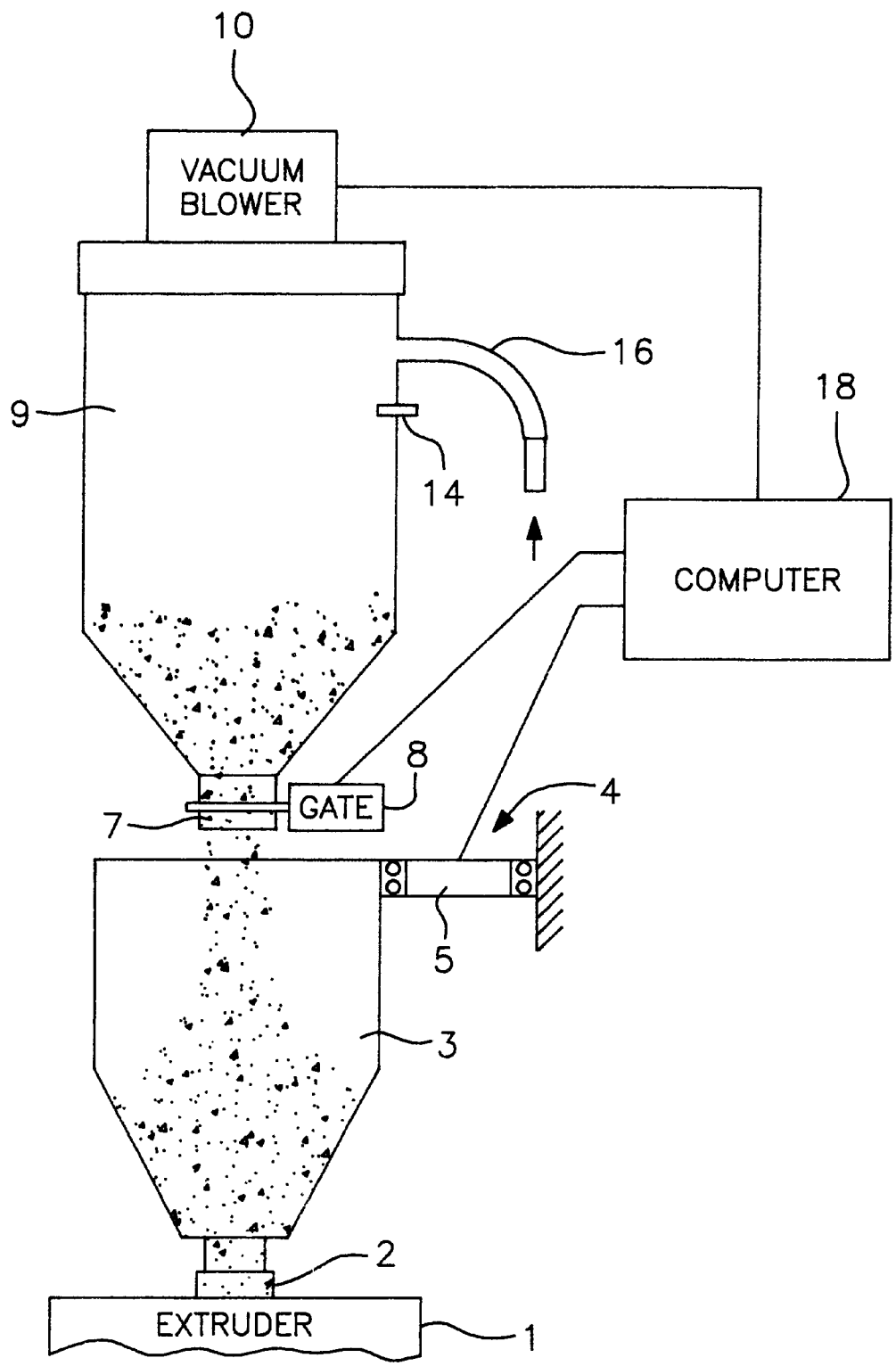

PROCEDURE FOR FEEDING PLASTIC GRANULATE INTO THE INTAKE OPENING OF A PLASTIC EXTRUDER

FIELD OF THE INVENTION

The invention involves a procedure for feeding plastic granulate into the intake opening of a plastic extruder with a storage tank, which is provided with a conveying device for filling it with a specified fill quantity and with a closable discharge mouth on the bottom, and with an intermediate storage tank—resting on a weighing device, or provided with a fill level measuring device—which is filled from the storage tank with a specified fill quantity when it has emptied down to a predetermined remaining quantity, and which has a discharge on the bottom flowing into the intake opening in which the specified quantity by weight of plastic material processed for the particular batch is determined by the rotations of the extruder screw.

BACKGROUND OF THE INVENTION

With extruder dies fed by plastic extruders in the manufacture of plastic products, for example profiles, tubes or blown films, the quantity involved in a batch is typically determined by the quantity, specified by weight, of the plastic granulate loaded into the extruder. The manufactured extruded plastic products have a specific weight per meter, so that, from the weight of the plastic material used, the quantity involved in a batch can also be determined according to running meters. Since a plastic extruder draws in a very precise quantity of plastic granulate, determined by weight, per rotation of its screw, the quantity of plastic material specified by weight processed by an extruder can be determined simply by the number of screw rotations. If a manufacturing process for a running batch of the type specified in the introduction, for example in a procedure known from DE 40 27 319 A1, ends when the rotations of the extruder screw corresponding to the batch quantity have been counted, unprocessed plastic granulate is typically still found in the storage and intermediate storage tanks. Should a subsequent batch then be run with a different recipe, that is with another plastic granulate, after the end of the batch, the leftover plastic granulate from the storage tank and the intermediate storage tank must be removed. This material is typically not processed for other batches, but instead discarded.

In the known procedure, it only occurs in exceptional cases that, at the end of a batch, the storage tank or intermediate storage tank has run empty or nearly empty. This is attributable to the fact that the storage tank is provided with a fill level meter, up to which it is always filled with material, for example through a vacuum line, when its discharge opening feeding into the intermediate storage tank is closed. The result is that the storage tank also will always be completely filled at the end of a batch, when the intermediate storage tank has not quite attained its lower fill level, and is filled again through opening of the discharge opening of the storage tank.

SUMMARY OF THE INVENTION

It is therefore the objective of the invention to specify a procedure of the type outlined in the introduction in which the recipe-, or batch-, change times can be considerably shortened and plastic granulate can be conserved.

According to the invention, this objective is met by means of a procedure of the type specified in the introduction, in which the intermediate storage tank is filled through opening of the storage tank discharge with a specific quantity by weight of plastic granulate, and the storage tank is filled with its constant fill quantity, after re-closure of its discharge, when the sum of the weight of the fill of both storage tanks corresponds to the remaining quantity by weight to be processed by the extruder, the conveyance of plastic material into the storage tank is discontinued, and the storage tank discharge is opened one or more times, until the quantity stored in it has entered into the intermediate storage tank.

A computer, which calculates and counts the number of revolutions of the extruder screw involved in a batch, and which controls the fillings of the storage tank and the intermediate storage tank, is provided for control of the quantity involved in a batch and the feed of the plastic granulate into the storage tank and for opening and closing of the discharge opening of the storage tank.

According to the first version of the procedure according to the invention, the storage tank can be filled volumetrically, after each closure of its discharge, by activation of a vacuum blower and suction of the plastic material through the vacuum line up to the fill level determined by its fill level meter. After that, the computer calculates from the volume and the specific weight, or weight per liter, the quantity by weight of plastic granulate in the storage tank.

Since the intermediate storage tank, with its discharge feeding into the mouth of the extruder, rests on a weighing device, the computer recognizes the particular fill weight of the intermediate storage tank based on the signals sent to it by the weighing device. Then, in order to be able to detect the remaining unprocessed quantity of granulate at the end of one of its batches so precisely that essentially no more leftover granulate remains in the storage tanks, the computer continually compares the remaining quantity with the fillings, or the fill volumes of the storage tanks. If the remaining required quantity calculated by the computer amounts to the complete fill quantity of the storage tank plus the remaining quantity of the intermediate storage tank just weighed, the discharge opening of the storage tank is closed by the computer immediately when it should not normally be closed, so that the storage tank is filled for the last time to its specified fill quantity. After that, further filling of the storage tank is discontinued, so that the running batch can be ended with the correct quantity of plastic, which is already present in the two storage tanks.

At the approach to the end of a running batch, the situation can result in which the storage tank is still completely filled and the intermediate storage tank still contains a remaining quantity. The sum of these quantities in the storage tank and the intermediate storage tank can just suffice to end the running batch.

According to a preferred embodiment it is therefore provided that the delivery of plastic material into the storage tank is discontinued when the complete filling of the storage tank and the momentary filling of the intermediate storage tank correspond to the required remaining quantity, and that the fill quantities still present are fed into the intake opening.

If the computer thus calculates that the remaining quantity of plastic granulate still required for the running batch corresponds to the complete filling of the storage tank and the momentary filling of the intermediate storage tank, the re-filling of the storage tank is prevented and the still present quantities in both storage tanks are released into the extruder.

According to another embodiment, the objective is satisfied according to the invention in that the fill quantity of the storage tank and the intermediate storage tank are weighed and the feed of material. into the storage tank is discontinued when the sum of the weight of the fill quantities of both storage tanks corresponds to the remaining quantity by weight to be processed by the extruder.

According to one version, it is provided as per the invention in a process for the feeding of plastic granulate into the intake opening of an extruder by means of a conveying device, in which at least one storage tank is provided between the conveying device and the intake opening of the extruder, that a computer cyclically determines the quantity of material between the conveying device and the intake opening the extruder and compares it to the quantity of material required to the end of the batch, and that the conveying device is turned off just before the end of a batch, as soon as the quantity of material above the intake opening is equal to or greater than the quantity of remaining material still necessary to finish off a batch. In the ideal case, it is likewise achieved through this version of the procedure that the storage tank is emptied until a batch is finished off.

BRIEF DESCRIPTION OF THE DRAWINGS

An embodiment of the invention is described in further detail below with reference to the drawing in which an intermediate storage tank and storage tank above the intake opening of an extruder are schematically represented in a single diagram.

DETAILED DESCRIPTION OF THE PREFERRED EMBODIMENTS

The intake opening 2 of an only schematically represented part of an extruder 1 hangs over an intermediate storage tank 3 configured as a proportioning scale. This intermediate storage tank 3 is supported by a support arm 4, which is connected with the indicated machine frame in the manner illustrated and has a strain gauge 5. This strain gauge assumes the function of a proportioning scale.

Above the intermediate storage tank 3, a storage tank 9 is arranged whose lower discharge 7 can be closed by a gate 8. In the upper region of the storage tank 9, a supply tube configured as a vacuum tube 16 feeds in. The cover of the storage tank 9 is provided with a vacuum blower 10 with which plastic granulate can be suctioned through the vacuum tube 16. The storage tank 9 is provided with a fill level meter 14, which detects the maximum permissible filling height in the storage tank.

In the operating condition represented in the drawing, the gate 8 is open, so that granulate can flow into the intermediate storage tank 3 functioning as a proportioning scale. By opening the gate 8, a signal is simultaneously generated which prevents the vacuum blower 10 from being activated. The gate 8 is closed as soon as a signal sent from the strain gauge 5 indicates that sufficient material is present in the intermediate storage tank 3. With the closing of the gate 8, a signal is immediately generated, which turns on the vacuum blower 10. The vacuum blower 10 remains on until enough granulate has been suctioned into the storage tank 9 through the suction tube 16, that the fill level meter 14 is activated by the increasing fill level. As soon as the fill level meter has detected the upper fill level in the storage tank 9, the vacuum blower 10 is shut off.

Emptying and filling of the intermediate storage tank 3 and the storage tank 9 occurs during the operation in the described manner. So far, the device described here corresponds to the device described in DE 40 27 319 A1 in relation to FIG. 3 there.

According to the procedure as per the invention, a computer 18 is also provided, which calculates from the batch quantity the number of rotations of the extruder screw required for the batch. From the rotations of the extruder screw still required from that point in time until the end of the batch, the computer calculates the quantity of plastic granulate still required to be inserted.

Furthermore, the computer continually detects the quantity by weight of granulate present in the intermediate storage tank so that, through a corresponding comparison, it can determine the point in time at which the required remaining quantity for that particular batch is equal to the quantity by weight that is still present in the intermediate storage tank and that is present in the storage tank, or can still be received from it. Should the discharge opening of the storage tank be wide open at this point in time, the computer closes it immediately so that the storage tank is filled for the last time for the running batch.

According to a version of the procedure as per the invention, the storage tank 9 also rests on a weighing device, so that the computer continually knows the fill weight of both storage tanks and the feeding of granulate to the storage tank is discontinued when the sum of the weight of both storage tanks corresponds to the remaining quantity calculated by the computer for the particular batch.

What is claimed is:

1. Procedure for feeding plastic granulate into an intake opening of a plastic extruder with a storage tank, the storage tank being provided with a conveying device for filling the storage tank with a specified fill quantity and with a closeable discharge mouth on a bottom of the storage tank, and an intermediate storage tank with a measuring device, said intermediate storage tank being filled from the storage tank with a specified fill quantity when the intermediate storage tank has emptied down to a predetermined remaining quantity, and which has a discharge on a bottom flowing into the intake opening of the plastic extruder, in which a specified quantity by weight of plastic material processed for a particular batch is determined by rotations of an extruder screw of the plastic extruder, the intermediate storage tank being filled through opening of the closeable discharge mouth of the storage tank with a specific quantity by weight of plastic granulate, and the storage tank being filled with a constant fill quantity after re-closure of the closeable discharge mouth, when the sum of the weight of the fill of both the storage tank and the intermediate storage tank corresponds to a remaining quantity by weight to be processed by the plastic extruder, conveyance of plastic material into the storage tank being discontinued, and being opened one or more times, until a quantity of plastic granulate stored in the storage tank has entered into the intermediate storage tank.

2. Procedure as defined in claim 1, wherein delivery of plastic material into the storage tank is discontinued when a complete filling of the storage tank and a momentary filling of the intermediate storage tank correspond to a required remaining quantity of plastic granulate, and fill quantities still present in both the storage tank and the intermediate storage tank are fed into the intake opening.

3. Procedure as defined in claim 1, wherein a fill quantity of the storage tank and the intermediate storage tank are weighed and feed of material into the storage tank is discontinued when a sum of the weight of the fill quantities of both the storage tank and the intermediate storage tank corresponds to a remaining quantity by weight to be processed by the plastic extruder.

4. Procedure for the feeding of plastic granulate into an intake opening of an extruder by a conveying device, in which, at least one storage tank is provided between the conveying device and the intake opening of the extruder, and a computer cyclically determines the quantity of material between the conveying device and the intake opening of the extruder and compares it to a quantity of material required until an end of a batch, and the conveying device is turned off just before the end of the batch, as soon as the quantity of material above the intake opening of the extruder is equal to or greater than a quantity of remaining material still necessary to finish off the batch.

* * * * *